United States Patent Office 2,776,756
Patented Jan. 8, 1957

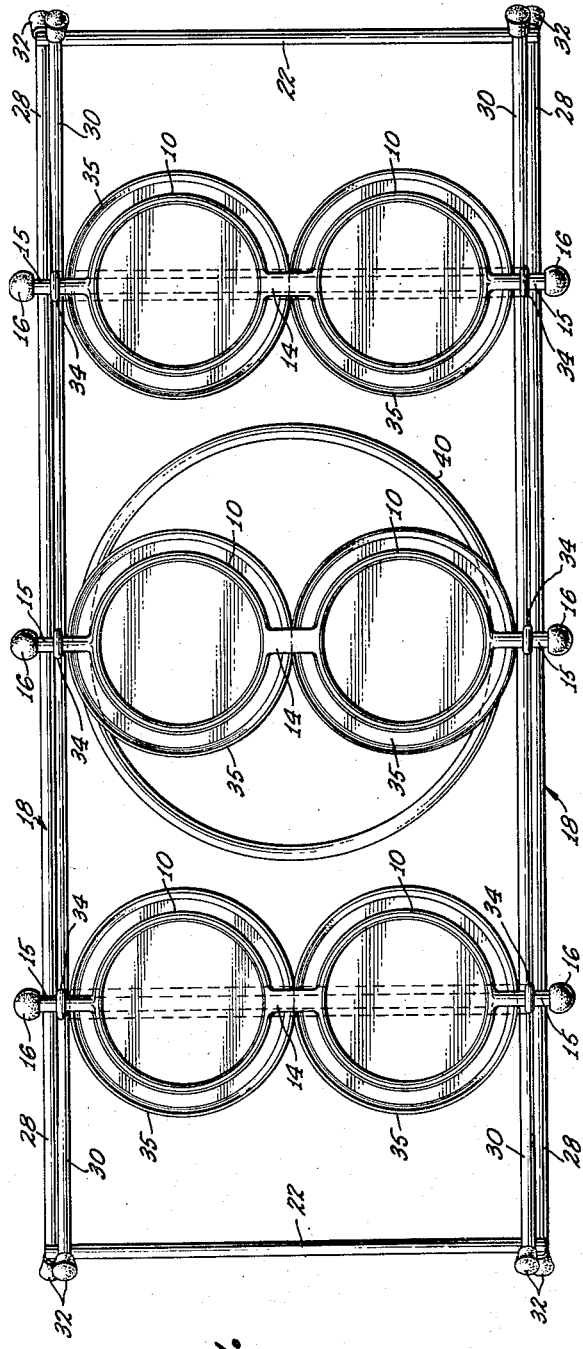
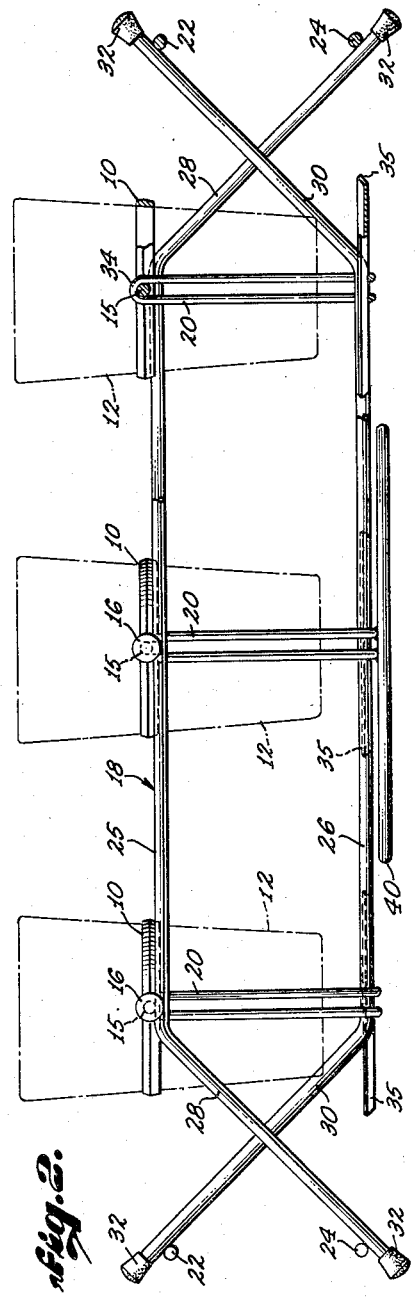
Fig. 1.
Fig. 2.
HARRY T. ALLAN,
INVENTOR.
ATTORNEY.

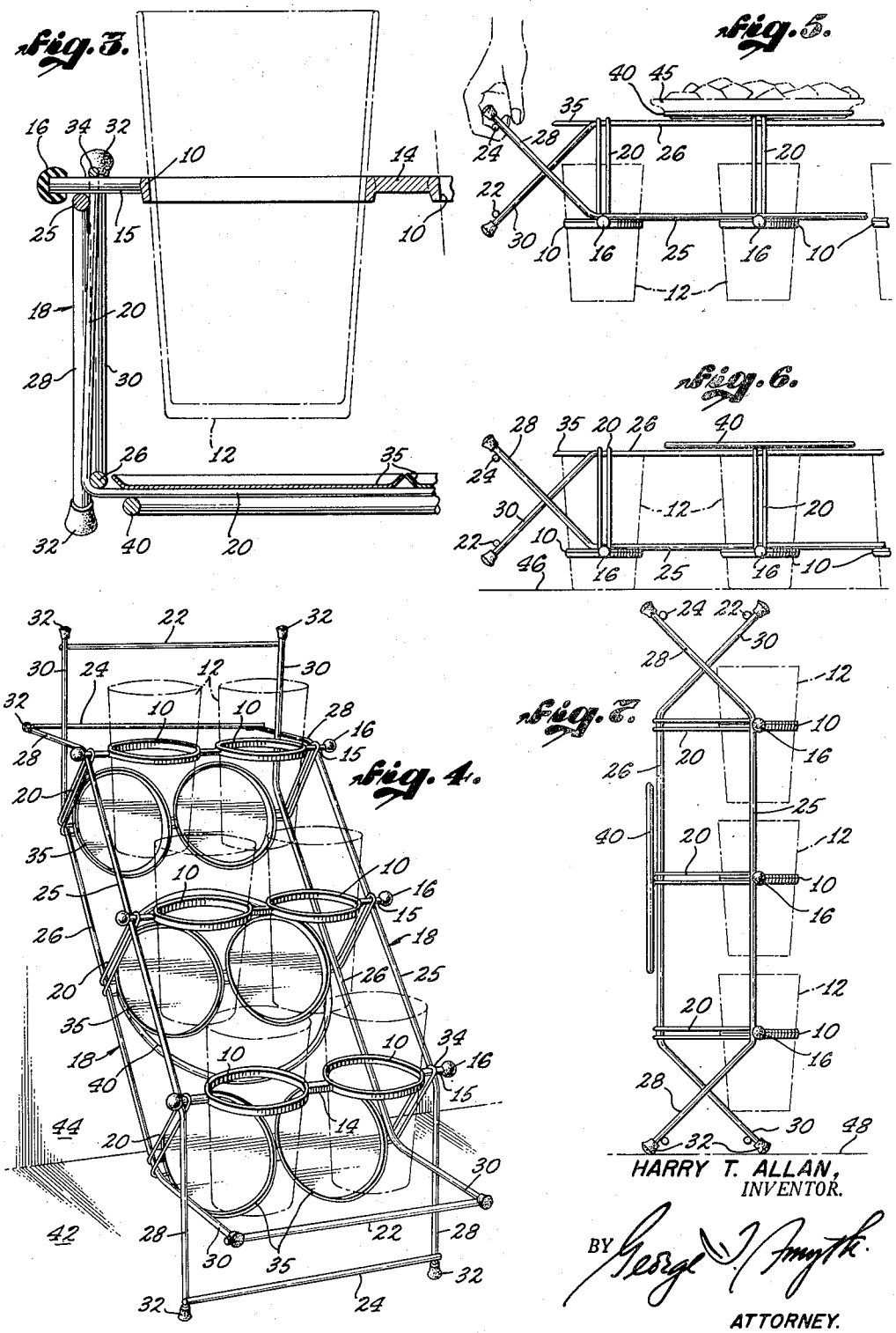

2,776,756

SERVING RACK FOR BEVERAGE TUMBLERS

Harry T. Allan, Manhattan Beach, Calif., assignor of one-half to Reldon G. Pinney, Gardena, Calif.

Application August 15, 1955, Serial No. 528,290

8 Claims. (Cl. 211—74)

This invention relates to a multiple-function serving rack for a set of drinking glasses or tumblers. The rack may be used in various positions to support the tumblers, to protect the liquid content of the tumblers as well as to protect surfaces beneath the rack from liquid that may drip from the tumblers, and to transport the tumblers together with food.

A special feature of the invention is that the multiple functions of the rack are made possible largely by the provision of means for pivotally suspending the individual tumblers in the rack structure in such manner that the rack may be inclined to various positions and may even be rotated to an upside down position with the individual tumblers acting under gravity to remain upright. For this purpose means to seat the individual tumblers are mounted on the rack to rotate about parallel transverse axes spaced apart longitudinally of the rack with these axes of rotation spaced above the centers of gravity of the tumblers.

A feature of the preferred practice of the invention is that the tumblers are of tapered configuration and each seating means provides a circular aperture to embrace a tumbler, the aperture being less in diameter than the rims of the tumbler but large enough to cause the tumbler to seat with its centers of gravity below the level of the aperture. This feature makes possible a construction in which pairs of integral ring members are used to seat the tumblers, each pair being provided with trunnions that are suitably journalled in the rack structure.

In the normal horizontal upright position of the rack on a support surface, the individual tumblers are supported at levels above the bottom of the rack in positions accessible for removal by persons that are being served. At this normal position of rest of the rack, special coaster members incorporated in the rack structure are immediately below the tumblers to catch any liquid that may drip therefrom.

If desired, the rack may also be inclined at a steep angle with the tumblers upright in staggered rows of two tumblers each. Thus the rack may be positioned to lean against a vertical surface with all the tumblers accessible for removal. Also, the rack may be positioned in a vertical rest position when not in use, the rack in this position occupying relatively little horizontal shelf space. A special feature of the invention in this regard is that it may also be hung on a wall in its vertical position.

With the set of tumblers filled with beverage portions, the rack may be carried by hand in any one of three different positions for transporting the tumblers to a serving area. One position is the previously mentioned normal horizontal position with the rack grasped by handles at its two ends and with the previously mentioned coaster members positioned under the tumblers to catch drippage. A second position of the rack is a vertical position with the rack suspended by either one of the two end handles.

The third position of the rack is an upside down horizontal position with the bottom side of the rack uppermost. One advantage of this reverse position is that the coaster members now overhang the tumblers in spaced relation thereto to serve as shields for the contents of the tumblers. A second and unique advantage is that the now uppermost bottom side of the rack may be used as a tray to carry a dish of snacks or hors d'oeuvres. A feature of the preferred practice of the invention in this regard is that the bottom side of the rack carries a guard to keep such a dish from slipping off the rack. This guard may be in the form of a shallow ring member.

A further feature of the invention is that when the horizontally positioned upside down rack is now lowered to a horizontal support surface, the tumblers come to rest on the support surface and the rack drops relative to the stationary tumblers until the overhanging coaster members come to rest on the rim of the tumblers. The coasters in these positions serve as effective covers for complete protection of the liquid contents of the tumblers and a special advantage is that the weight of the whole rack is imposed on the coasters to keep them in snug contact with the tumblers. The rack is free to descend on the tumblers in this manner since the pairs of integral rings in which the tumblers rest are free to drop down the tapered sides of the tumblers.

The various features and advantages of the invention will be apparent in the following detailed description considered with the accompanying drawing.

In the drawings, which are to be regarded as merely illustrative:

Figure 1 is a plan view of the selected embodiment of the invention as a rack to hold a set of six tumblers;

Figure 2 is a side elevation of the same rack;

Figure 3 is an enlarged transverse fragmentary section showing how a tumbler is seated in the rack;

Figure 4 is a perspective view on a small scale showing the device in inclined position resting on a horizontal surface and leaning against a vertical surface;

Figure 5 is a fragmentary section showing the rack in a reversed horizontal position for use as means to carry a plate of food along with the set of tumblers;

Figure 6 is a view similar to Figure 5 showing how the rack in the reversed horizontal position may serve as means to cover all of the tumblers of the set; and Figure 7 is a side elevation of the rack in upright position.

The selected embodiment of the invention provides for pivotally suspending the glass tumblers in pairs, there being three pairs of seating means to hold three pairs of tumblers. In the construction shown, each of the seating means comprises a metal ring 10 to receive and hold a tapered tumbler 12. The inside diameter of the ring 10 is less than the outside diameter of the upper end or rim of the tumbler 12 and greater than the diameter of the bottom of the tumbler so that when the tumbler is dropped into the ring, it is firmly embraced by the ring. It is important to note that the ring is large enough for the tumbler to drop well into the ring so that the center of gravity of the tumbler is substantially below the plane of the ring.

For the purpose of holding the tumblers 12, the rings 10 are rigidly interconnected in pairs, each pair of rings being integral with a central interconnecting member 14 and a pair of trunnions or elongated spindles 15. In the construction shown, each of the trunnions 15 has an ornamental enlargement 16 on its outer end in the form of a ball of rubber-like material which serves as a bumper covering the metal end.

The three pairs of rings for seating the corresponding three pairs of tapered tumblers 12 are pivotally mounted on a suitable structure to complete the multiple-purpose rack. In the present embodiment of the invention, this framework comprises two side frames, each designated 18, which side frames are interconnected by three yokes 20 and by four end handles, there being an upper handle 22 and a lower handle 24 at each end of the frame.

Each of the side frames 18 may be formed by an upper longitudinal wire 25 and a lower longitudinal wire 26, the major portions of these two wires being horizontal. The upper wire 25 has two downwardly inclined end portions 28 at its opposite ends and in like manner the lower longitudinal wire 26 has two upwardly inclined portions 30 at its opposite ends. At each end of the side frame, the inclined portions 28 and 30 intersect and are bonded together by brazing or welding. The upward transverse handle 22 at each end comprises a straight piece of rigid wire interconnecting the corresponding upwardly inclined wire portions 30 of the two side frames and in like manner the lower transverse handle 24 at each end comprises a rigid piece of wire interconnecting the corresponding downwardly inclined wire portions 28 of the two side frames. These handle wires 22 and 24, which may be welded or brazed to the inclined wire portions, are spaced inwardly from the ends of the inclined wire portions to which end they are bonded. In this regard, a feature of the disclosed construction is that the eight ends of the inclined wire portions 28 and 30 are provided with tip members 32 of rubber-like material.

Each of the three yokes 20 may comprise a pair of closely spaced parallel wires which are bonded together to form a continuous wire loop. Each of the yokes 20 is U-shaped with the lower portion of the U interconnecting the bottom wires 26 of the two side frames 18 and with the upper ends of the legs of each U connected to the upper longitudinal wires 25 of the side frames. The yokes 20 may be welded or brazed to the longitudinal wires.

As best shown in Figures 2 and 3, the upper ends of the legs of the yokes 20 extend slightly above the horizontal wires 25 to provide wire loops 34 to serve as bearings for journalling the previously mentioned trunnions or elongated spindles 15. Thus each trunnion 15 normally rests on a longitudinal wire 25 and is held in position thereon by an upwardly extending wire loop 34.

The invention further includes what may be termed coaster members 35 positioned on the bottom side of the rack in position to catch drippage from the various tumblers 12 when the rack is in its normal upright position shown in Figure 2. In the construction shown, there is a shallow pan-like coaster member 35 under each of the tumblers 12, each pair of the coasters being mounted on one of the yokes 20.

A further feature of the preferred practice of the invention shown in the drawing is the inclusion of a central wire ring 40 of relatively large diameter on the underside of the rack. This ring 40 is welded or brazed to the underside of the central yoke 20.

When the rack rests in its normal horizontal position on the horizontal support surface as shown in Figure 2, the four downwardly inclined wire portions 28 serve as support legs and the rubber tips 32 thereon keep the ends of these wire legs from marring any horizontal surface on which the rack may be positioned. It can be seen in Figures 1 and 2 that the coaster members are positioned directly under the tumblers to catch drippage therefrom for the protection of any support surface on which the device may be placed.

In this normal upright horizontal position of the rack, the upper handles 22 at each end may be grasped for the purpose of carrying the rack from one location to another. If the rack is inclined longitudinally while it is being handled the tumblers will automatically maintain their upright positions by virtue of the fact that the centers of gravity of the tumblers are below the axes of the various trunnions 15.

Figure 4 shows how the rack may be inclined with the lower end of the rack on a horizontal surface 42 and the upper end of the rack leaning against a vertical surface or wall 44. The tumblers automatically maintain their upright positions by virtue of their centers of gravity being below their suspension axes. It will be noted that when the rack is inclined in this manner, the pairs of tumblers 12 are staggered or positioned in echelon so that all of the tumblers are accessible for individual removal from the rack.

Figure 5 shows how, with the various tumblers 12 filled with beverage, the rack may be rotated to an upside down vertical position with the bottom side of the rack uppermost. The plane of rotation in which the rack is rotated from the normal horizontal position of Figure 2 to the reversed horizontal position of Figure 5, is, of course, a longitudinal plane that is perpendicular to the axes of the various trunnions 15. In the course of this rotation for reversal of the rack, the various tumblers 12 are gravitationally maintained in upright position as previously explained. When the rack is used in this reversed position to carry the set of tumblers from one place to another, the rack may be used at the same time to transport a dish of food. Thus Figure 5 shows a dish 45 of snacks positioned inside the wire ring 40, the wire ring serving as means to keep the ends from sliding off the rack. When the rack is carried in this reversed horizontal position, the two transverse end handles 24 are used as shown in Figure 5.

When the rack in its upside down horizontal position shown in Figure 5 is lowered onto a horizontal support surface 46, as indicated in Figure 6, the various tumblers 12 come to rest on the surface 46 and the various rings 10 drop down from their normal positions on the tumblers to permit the various coaster members 32 to come to rest on the rims of the individual tumblers. Thus the coasters serve as effective individual covers for the tumblers and the weight of the rack is advantageous in tending to hold the various covers snugly in place. The contents of the tumblers may be protected prior to service in this manner and then the rack may be rotated in the previously described manner back to its normal upright horizontal position to make the various tumblers accessible for removal individually.

Figure 7 shows how the rack may be stored or positioned upright on a horizontal surface 48 when the rack is not in use. In this upright position, the rack occupies relatively little area of the horizontal surface. In this same upright position the rack may be hung on a wall with the uppermost transverse handle 24 engaged by a cup hook or the like. If desired, the rack may be carried in this upright position for the purpose of transporting the tumblers filled with beverage. Either of the two transverse handles 22 and 24 at the upper end of the rack may be used to carry the rack in suspended position.

My description in specific detail of the selected embodiment of the invention will suggest changes, substitutions and other departures from the disclosure that properly lie within the spirit and scope of the appended claims. Thus it is apparent that the framework of the rack in which the seating means for the various tumblers are pivotally mounted may be of various constructions in various practices of the invention.

I claim:

1. A refreshment serving rack and tumblers carried thereby including in combination a pair of elongated side frames, members extending between and connecting the opposite corner portions of said side frames to form with said side frames an open rectangular framework, said members providing handles at the opposite ends of said framework, a plurality of tumbler supports extending transversely of said open framework and pivotally mounted adjacent the upper longitudinal edges of said side frames to be rotatable about parallel pivot axes, a plurality of tumblers of predetermined length, at least one of said tumblers removably held by each of said tumbler supports at a point intermediate its length with the center of gravity of such tumbler disposed below the rotation axis of the support in which it is held whereby the tumblers seek upright positions gravitationally irrespective of the position of inclination of the longitudinal axis of said rack, the parallel pivot axes of said tumbler supports being spaced from one another at a distance greater than the length of the tumblers to permit the tumblers to swing and remain upright upon inverting said framework without tumblers held by adjacent supports obtructing free swinging movement, each of said handles being spaced from the nearest tumbler support pivot axis to permit free swinging movement of the tumbler held by the nearest support when a handle is grasped in carrying the rack, additional connecting means extending between said side frames beneath said tumblers providing imperforate coaster means in the normal horizontal position of said rack, said coaster means being of an area greater than the mouths of the tumblers and being located at a distance beneath the uppermost extremity of said framework less than said predetermined length of said tumblers whereby with said rack inverted and said tumblers brought to rest on a horizontal surface, said coaster means will firmly engage with and cover said tumblers to preclude foreign matter from entering the tumblers.

2. The combination as set forth in claim 1 in which said coaster means comprises a plurality of individual coaster members.

3. The combination as set forth in claim 1 in which the lower corner portions of said side frames project downwardly at opposite ends of the framework to serve as supporting feet for the rack when it is in its normal horizontal position resting on a horizontal surface.

4. The combination as set forth in claim 1 in which said members define an upper handle and a lower handle extending between and connecting the ends of said side frames at each end of the rectangular framework, said upper handles being above the levels of the centers of gravity of said tumblers when the device is in its normal horizontal position and said lower handles being above the levels of the centers of gravity when the device is in its upside down horizontal position.

5. The combination as set forth in claim 1 in which each of said tumbler supports comprises a pair of ring elements united with each other and a pair of trunnions united with the ring elements at diametrically opposite sides of the support to hold a pair of said tumblers.

6. A refreshment serving rack and tumblers carried thereby including in combination a pair of elongated side frames, rodlike handle members interconnecting the opposite corners of said side frames to retain said frames parallel in the form of an open rectangular framework and provide upper and lower handles at the opposite ends of said framework, a plurality of tumbler supports each having a pair of ring elements united with each other to lie in a common plane and a pair of trunnions extending outwardly from said ring elements at opposite ends of the support, said trunnions pivotally mounting said tumbler supports on the upper longitudinal edges of said side frames to be rotatable about parallel pivot axes, a plurality of tumblers of predetermined length, one of said tumblers individually removably held by each of said ring elements at a point intermediate its length with the center of gravity of the tumbler disposed below the rotation axis of the tumbler support in which it is held whereby the tumblers seek upright positions gravitationally irrespective of the position of inclination of the longitudinal axis of said rack, the parallel pivot axes of said tumbler supports being spaced from one another at a distance greater than the length of the tumblers to permit the tumblers to swing and remain upright upon inverting said framework without tumblers held by adjacent supports obstructing free swinging movement, each of said handles being spaced from the nearest tumbler support pivot axis to permit free swinging movement of the tumbler held by the nearest support means when a handle is grasped in carrying the rack, coaster means mounted between the lower longitudinal edges of said side frames to be positioned beneath said tumblers, said coaster means being located at a distance beneath the uppermost extremity of said framework less than said predetermined length of said tumblers whereby with said rack inverted and said tumblers brought to rest on a horizontal surface, said coaster means will firmly engage with and cover said tumblers to preclude foreign matter from entering said tumblers.

7. A refreshment serving rack and tumblers carried thereby including in combination an elongated framework having parallel generally planar side frames connected at their four corners by rodlike handle members, the corners of said side frames adjacent the point of connection of said handle members therewith protruding outwardly to provide supporting feet for said rack when resting on a horizontal surface in its normal horizontal position, each of said side frames having an upper longitudinal member and a lower longitudinal member, a plurality of tumbler supports having bearing means at the opposite ends thereof and apertures to releasably retain a tumbler, a plurality of tumblers of predetermined length, a tumbler removably held at a point intermediate its length in each of the apertures of said tumbler supports with the center of gravity of the tumblers disposed below the rotation axes of the supports whereby the tumblers seek upright positions gravitationally irrespective of the position of inclination of the longitudinal axis of said rack, journals having the bearing means of said tumbler supports mounted therein on said upper longitudinal members of said frame, said journals being spaced apart at distances greater than the length of said tumblers to permit the tumblers to swing and remain upright upon inverting said framework without tumblers held by adjacent supports obstructing free swinging movement, each of said handle members being spaced from the nearest tumbler support pivot axis to permit free swinging movement of the tumblers held by the nearest support when a handle is grasped in carrying the rack, coaster forming wall means supported by and between said lower longitudinal members of said side frames to be disposed beneath the tumblers carried by said tumbler supports in the normal horizontal position of said rack, said wall means providing on its underside an article carrying surface when the rack is inverted, and a raised barrier protruding downwardly from and surrounding an area on the underside of said wall means to restrain articles carried thereon within said area from sliding off when the rack is in its inverted position as used in transporting articles in addition to the tumblers.

8. The combination as set forth in claim 7 in which said raised barrier on the underside of said frame is formed by a circular ring member.

References Cited in the file of this patent

UNITED STATES PATENTS

| D. 16,533 | Warner | Feb. 16, 1886 |
| 2,107,744 | Solomon | Feb. 8, 1938 |
| 2,597,460 | Eberhardt | May 20, 1952 |

FOREIGN PATENTS

| 216 | Austria | Sept. 25, 1899 |
| 148,950 | Germany | Feb. 29, 1904 |
| 418,729 | Great Britain | Oct. 30, 1934 |
| 452,789 | Italy | Oct. 29, 1949 |